United States Patent [19]
Vogt et al.

[11] Patent Number: 6,155,126
[45] Date of Patent: Dec. 5, 2000

[54] INTEGRATED SHIFT MOTOR AND ELECTRONIC CONTROLLER

[75] Inventors: Carl Randall Vogt, Raleigh, N.C.; Richard K. Rader, Laguna Hills, Calif.; James David Warren, Clayton, N.C.

[73] Assignee: BorgWarner Inc., Troy, Mich.

[21] Appl. No.: 09/420,366

[22] Filed: Oct. 18, 1999

[51] Int. Cl.⁷ .......................... B60K 41/06; F02D 29/00
[52] U.S. Cl. .............................................................. 74/335
[58] Field of Search ................................. 74/335, 473-12

[56] References Cited

U.S. PATENT DOCUMENTS

| | | | |
|---|---|---|---|
| 4,440,042 | 4/1984 | Holdeman | 74/785 |
| 4,975,628 | 12/1990 | Lemieux | 318/599 |
| 4,998,444 | 3/1991 | Mabee | 74/335 |
| 5,225,961 | 7/1993 | Zander et al. | 361/356 |
| 5,357,161 | 10/1994 | Daniels | 310/89 |
| 5,377,082 | 12/1994 | Fisher et al. | 361/823 |
| 5,408,154 | 4/1995 | Meiser et al. | 310/71 |
| 5,589,805 | 12/1996 | Zuraski et al. | 332/109 |
| 5,675,223 | 10/1997 | Yoshizawa et al. | 318/139 |
| 5,742,142 | 4/1998 | Witt | 318/599 |
| 5,780,771 | 7/1998 | Beckwith et al. | 174/17.08 |
| 5,825,146 | 10/1998 | Agata et al. | 318/439 |
| 5,970,811 | 10/1999 | Imao et al. | 74/335 |
| 6,073,507 | 6/2000 | Ota et al. | 74/335 |

*Primary Examiner*—Dirk Wright
*Attorney, Agent, or Firm*—Brinks, Hofer, Gilson & Lione; Greg Dziegielewski

[57] ABSTRACT

An integrated shift motor and electronic controller reduces weight and provides improved performance. The shift control motor includes an output shaft having a first sensor wheel and adjacent sensor which provide signals regarding the rotation and direction of rotation of the motor. The motor drives a gear train having an output member which is coupled to and rotates a shift rail. A sensing wheel is disposed on the output member and adjacent sensors provide signals regarding the angular position of the output member. The sensors drive a microcontroller which in turn drives the shift control motor. Preferably, the sensors, the drive motor, the gear train and the microcontroller are all disposed in a housing. The rotating shift rail includes a pair of spaced-apart followers which engage a cam member which bi-directionally positions a shift fork associated with a multiple position clutch or shift collar.

20 Claims, 5 Drawing Sheets

INTEGRATED SHIFT MOTOR AND ELECTRONIC CONTROLLER

BACKGROUND OF THE INVENTION

The invention relates generally to devices for shifting clutches in motor vehicle drive line components and more specifically to an integrated unit having a shift motor and electronic controller disposed in housing.

Selection of gear or speed ranges in motor vehicle components such as automatic transmissions and transfer cases takes many forms. In automatic transmissions, pressure sensors, hydraulic actuators and band clutches achieve shifts according to carefully developed programs relating to speed, acceleration and other variables. Gear selection in motor vehicle transfer cases is typically made by the vehicle operator and thus the devices tend to be less complex and include a hydraulic or electric operator coupled through a suitable linkage to a shift fork which moves a multiple position clutch member. Various sensors may be disposed on or adjacent the moving components to provide feedback to a controller to indicate the position of the clutch member.

Certain operational conditions present difficulties with such shift arrangements. When transferring large torque loads, the circumferential forces on gear teeth may render it difficult or impossible to disengage the gear teeth until such torque loads are reduced. Such a condition is often referred to as torque block. A comparable problem on engagement stems from a different situation. During attempted engagement, if the faces of the gear teeth clash, engagement will likewise be difficult or impossible. This condition is often referred to as spline block. Both of these conditions result in the inability to complete a directed or commanded shift.

How the shift linkage resolves these conditions has been addressed in many ways. One of the more common solutions is to provide an energy storing and force generating device such as a spring between the operator and the clutch. When torque block or spline block is encountered, the operator, typically an electric motor, moves to its final position, the spring stores energy and the shift is completed when the shift inhibiting condition abates. This solution, however, may require motors of a larger size than would otherwise be necessary, motors capable of being safely stalled and may create operational anomalies if the shift is delayed for a relatively long period of time.

Another issue with prior art shift control assemblies relates to the operating environment. Typically, an electric drive motor is mounted on the outside of a transfer case and coupled to a clutch through a shift linkage. Sensors, often disposed within the transfer case, provide information regarding the current status of the shift linkage to a remotely mounted controller through cables and connectors and the controller provides drive signals to the electric shift motor, again through cables and connectors. The separation of these components and their interconnection through cables and connectors, which facilitate installation and service, occasionally are the source of operating anomalies.

The invention herein disclosed and claimed addresses these and many other design issues.

SUMMARY OF THE INVENTION

An integrated shift motor and electronic controller reduces weight and provides improved performance. The shift control motor includes an output shaft having a first sensor wheel and adjacent sensor which provide signals regarding the rotation and direction of rotation of the motor. The motor drives a gear train having an output member which is coupled to and rotates a shift rail. A second sensing wheel is disposed on the output member and adjacent sensors provide signals regarding the angular position of the output member. The sensors drive a microcontroller which in turn drives the shift control motor. Preferably, the sensors, the drive motor, the gear train and the microcontroller are all disposed in a housing. The rotating shift rail includes a pair of spaced-apart followers which engage a cam member which bi-directionally positions a shift fork associated with a multiple position clutch or shift collar.

It is thus an object of the present invention to provide an integrated shift motor and electronic controller which senses and controls a shift mechanism.

It is a further object and advantage of the present invention to provide a shift control motor and electronic controller which are contained within a single housing.

It is a still further object of the present invention to provide a shift motor and electronic controller which reduces the number of wiring harnesses and electrical connectors relative to previous designs.

It is a still further object of the present invention to provide a shift control motor and electronic controller having position sensing assemblies associated with both the motor and gear train outputs.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
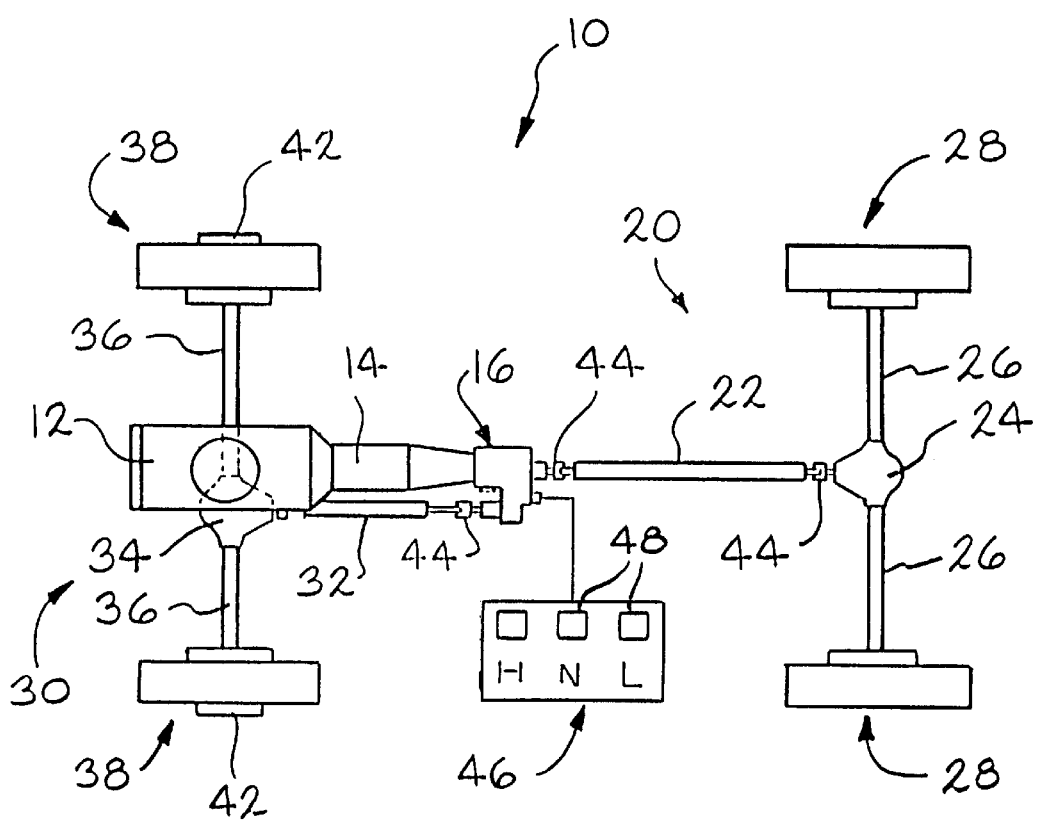
FIG. 1 is a diagrammatic, plan view of a four-wheel drive motor vehicle having a transfer case incorporating an integrated shift control assembly according to the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components. A control console 46 which is preferably disposed within convenient reach of the vehicle operator includes a switch or a plurality of individual switches or push buttons 48 which facilitate selection of the operating mode of the transfer case assembly 16 as will be further described below.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized with transmissions and transfer cases wherein the primary drive line 20 is disposed at the front of the vehicle and the secondary drive line 30 is disposed at the rear of the vehicle. Such designations "primary" and "secondary" thus broadly characterize the function of the individual drive lines rather than their specific locations.

Figure 2:
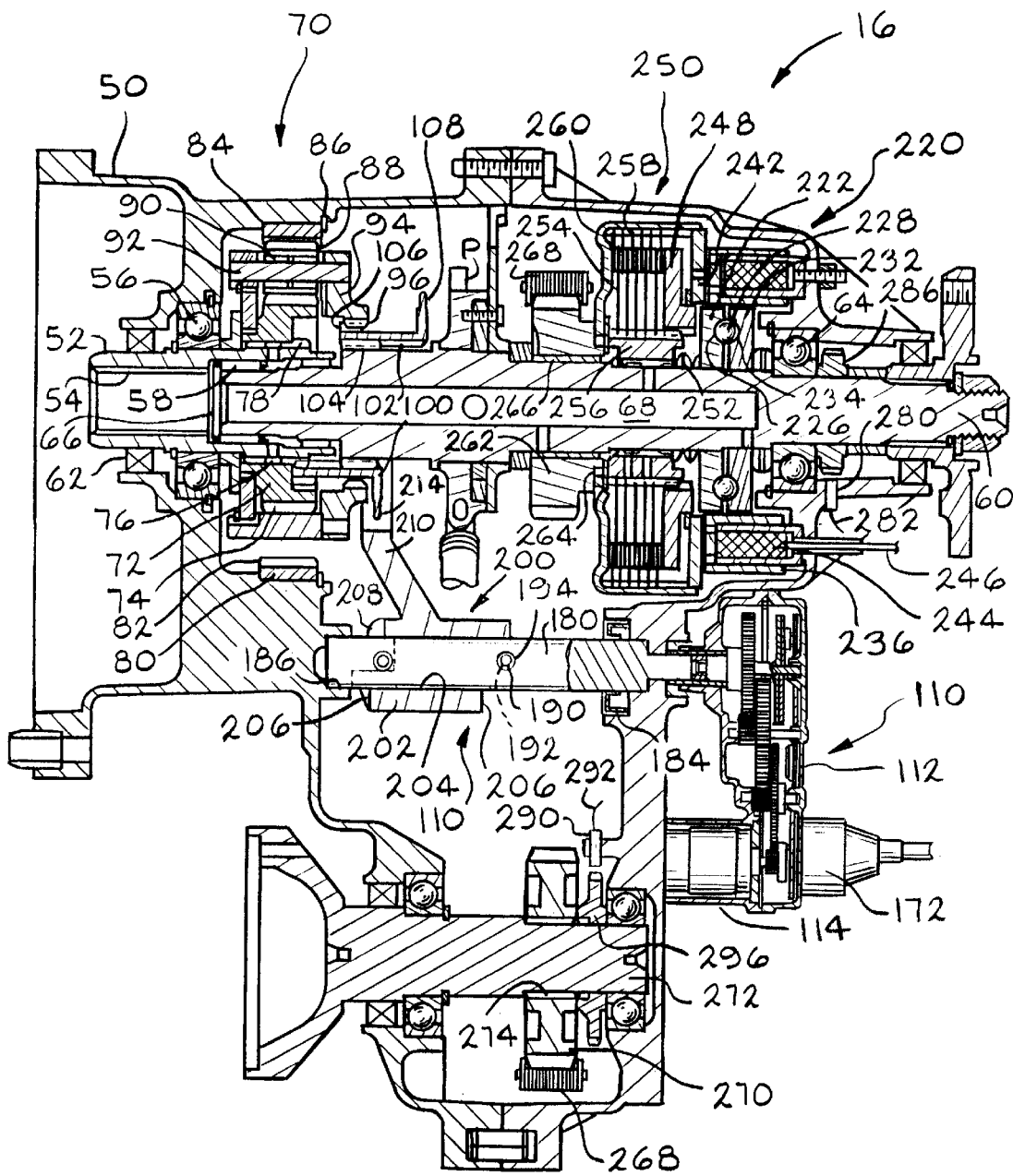
FIG. 2 is full, sectional view of a transfer case incorporating an integrated shift control assembly according to the present invention.

Referring now to FIGS. 1 and 2, the transfer case assembly 16 incorporating the present invention includes a multiple piece, typically cast, housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 illustrated in FIG. 1 to the input shaft 52. The input shaft 52 is rotatably supported externally by an anti-friction bearing such as the ball bearing assembly 56 and internally by an anti-friction bearing such as the roller bearing assembly 58. The roller bearing assembly 58 is disposed upon a reduced diameter portion of an output shaft 60. An oil seal 62, positioned between the input shaft 52 and the housing assembly 50, provides an appropriate fluid tight seal therebetween. The opposite end of the output shaft 60 is supported by an anti-friction bearing such as a ball bearing assembly 64. An end cap or seal 66 closes off the end of an axial passageway 68 in the output shaft 60. A gerotor pump P will typically be utilized to provide a flow of lubricating and cooling fluid to the axial passageway 68 which is thence distributed through a plurality of radial ports in the output shaft 60 to the components of the transfer case assembly 16.

The transfer case assembly 16 also includes a two-speed planetary (epicyclic) gear assembly 70 disposed generally about the input shaft 52. The planetary gear assembly 70 includes a sun gear collar 72 having a plurality of external gear teeth 74 and a plurality of internal splines or gear teeth 76. The internal splines or gear teeth 76 are engaged by complementary external splines or gear teeth 78 formed on the input shaft 52. Radially aligned with the sun gear 72 and its teeth 74 is a ring gear 80 having internal gear teeth 82. The ring gear 80 is fixedly retained within the housing assembly 50 by any suitable retaining structure such as a projection or lip 84 formed in the housing assembly 50 and a cooperating snap ring 86. A plurality of pinion gears 88 are rotatably received upon a like plurality of anti-friction bearings such as roller bearings 90 which, in turn, are supported and located by a like plurality of stub shafts 92. The plurality of stub shafts 92 are mounted within and secured to a planet carrier 94. The planet carrier 94 includes a plurality of internal splines or gear teeth 96. The planetary gear assembly 70 is more fully described in co-owned U. S. Pat. No. 4,440,042 which is herein incorporated by reference.

The planetary gear assembly 70 also includes a dog clutch or clutch collar 100 defining elongate internal splines or gear teeth 102. The internal splines or gear teeth 102 of the clutch collar 100 are slidably received upon a complementary plurality of external splines or gear teeth 104 on the output shaft 60. The clutch collar 100 thus rotates with the output shaft 60 but may translate bi-directionally therealong. The clutch collar 100 also includes external splines or gear teeth 106 on one end which are in all respects complementary to the internal splines or gear teeth 96 on the planet carrier 94. The end of the clutch collar 100 opposite the gear teeth 96 defines a circumferentially and radially extending flange 108.

The clutch collar 100 is capable of three positions and operational modes. In the lower portion of FIG. 2, the clutch collar 100 is illustrated in its leftmost or direct drive position. Direct drive is achieved when the internal splines or gear teeth 102 of the clutch collar 100 engage the external splines or gear teeth 78 on the input shaft 52 thereby directly coupling the input shaft 52 to the output shaft 60 and providing direct or high gear drive therebetween.

When the clutch collar 100 is moved to the right from the position illustrated in the lower portion of FIG. 2, to the position illustrated in the upper portion of FIG. 2, the speed reduction achieved by the planetary gear assembly 70 is engaged through engagement of the external splines or gear teeth 106 on the clutch collar 100 with the internal splines or gear teeth 96 on the planet carrier 94. So engaged, the planetary gear assembly 70 is active and provides a speed reduction, typically in the range of from 3:1 to 4:1 between the input shaft 52 and the output shaft 60. Between these two positions is a neutral position. In the center, neutral position both the input shaft 52 and the planet carrier 94 are disconnected from the output shaft 60 and no power is transmitted therebetween.

Figure 3:
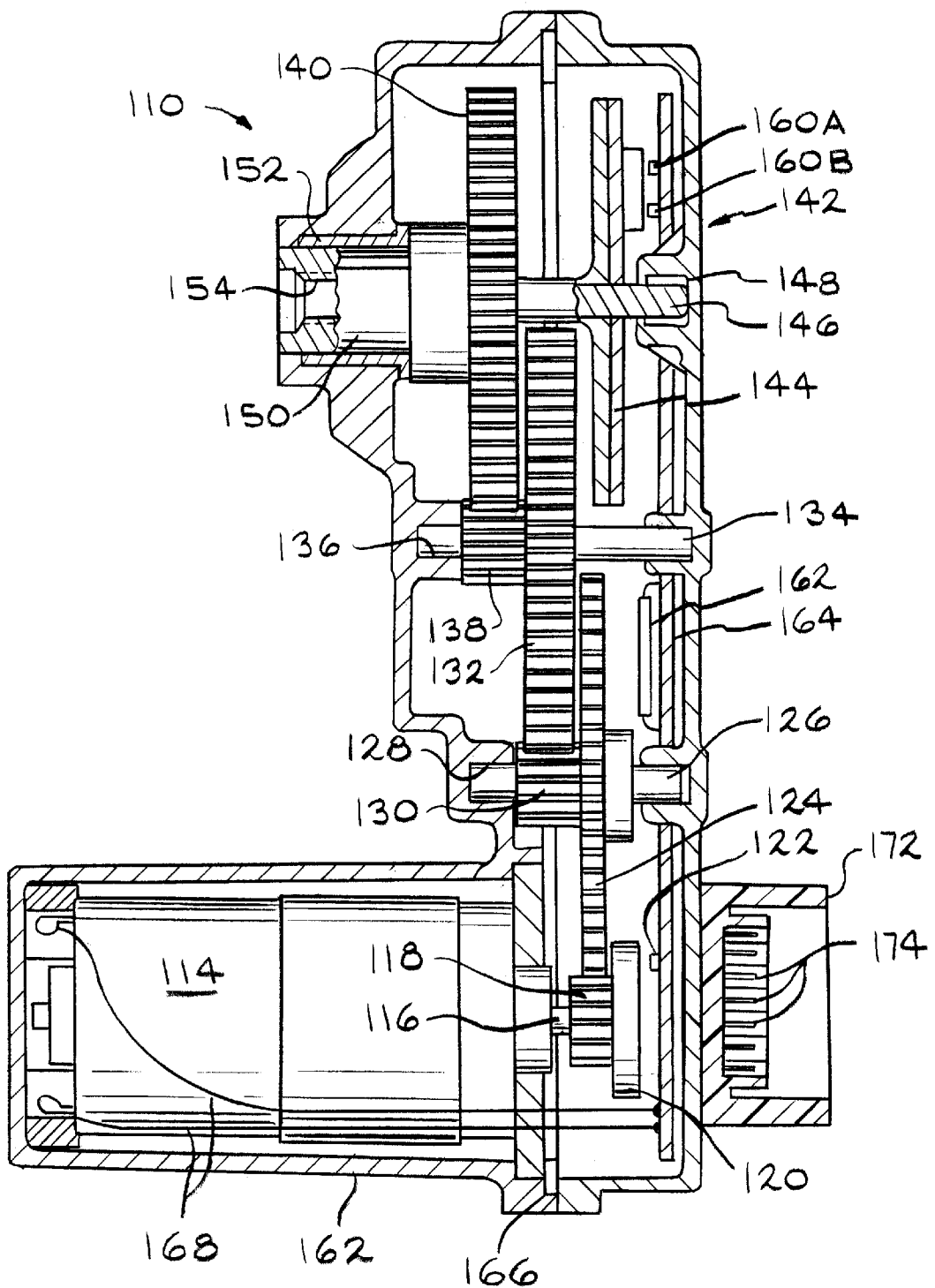
FIG. 3 is an enlarged, fragmentary, sectional view of an integrated shift control assembly according to the present invention.
Figure 4:
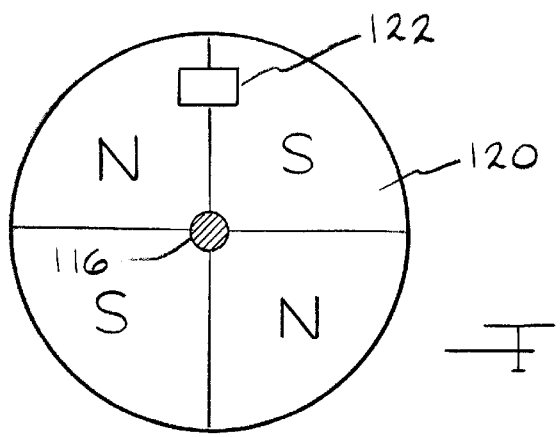
FIG. 4 is an enlarged, plan view of a magnet ring on a drive motor output shaft of an integrated shift control assembly according to the present invention.

Referring now to FIGS. 2, 3 and 4, the position of the clutch collar 100 is commanded by an integrated electric shift control assembly 110. The integrated shift control assembly 110 includes a two-piece auxiliary housing 112. The two-piece auxiliary housing 112 includes various openings and counterbores which receive components of the integrated shift control assembly 110 and protects such components as well. Preferably, the auxiliary housing 112 is die cast of aluminum or other suitable strong and relatively light weight material.

Mounted within the auxiliary housing 112 is an electric drive motor 114 having an output shaft 116 coupled to a first drive pinion 118. Also secured to and rotating with the output shaft 116 is a magnet ring 120. The magnet ring 120 is preferably divided into four quadrants having alternating magnetic poles. As the magnet ring 120 rotates, an adjacent sensor 122 detects changed in the magnetic polarity and provides output signals indicating both rotation and the direction of rotation. With a magnet ring 120 having four quadrants, four pulses per revolution are generated. The sensor 122 may be an Allegro Model 3422 Hall effect sensor or functionally similar device such as optical or variable reluctance sensors.

The first drive pinion 118 is in constant mesh with the teeth of a first spur gear 124 which is received upon a stub shaft 126 which seats within suitably disposed counterbores 128 formed in the auxiliary housing 112, as noted above. The first spur gear 124 is coupled to or integrally formed with a second pinion gear 130 which effects a second speed reduction with a second spur gear 132. Similarly, the second spur gear 132 is secured to a stub shaft 134 which is received within suitable aligned counterbores 136 formed in the auxiliary housing 112. A third pinion gear 138 is integrally formed with or secured to the second spur gear 132 and effects a third speed reduction as it drives a third spur gear 140. The third spur gear 140 is fixedly secured to an output shaft assembly 142 and rotates therewith. The output shaft assembly 142 includes a circular disc or plate 144 secured to or integrally formed with an output shaft 146 received within a counterbore 148. On the opposite side of the third spur gear 140 is an output member 150 which is received within a sleeve 152. The output number 150 defines a splined counterbore 154.

Figure 5:
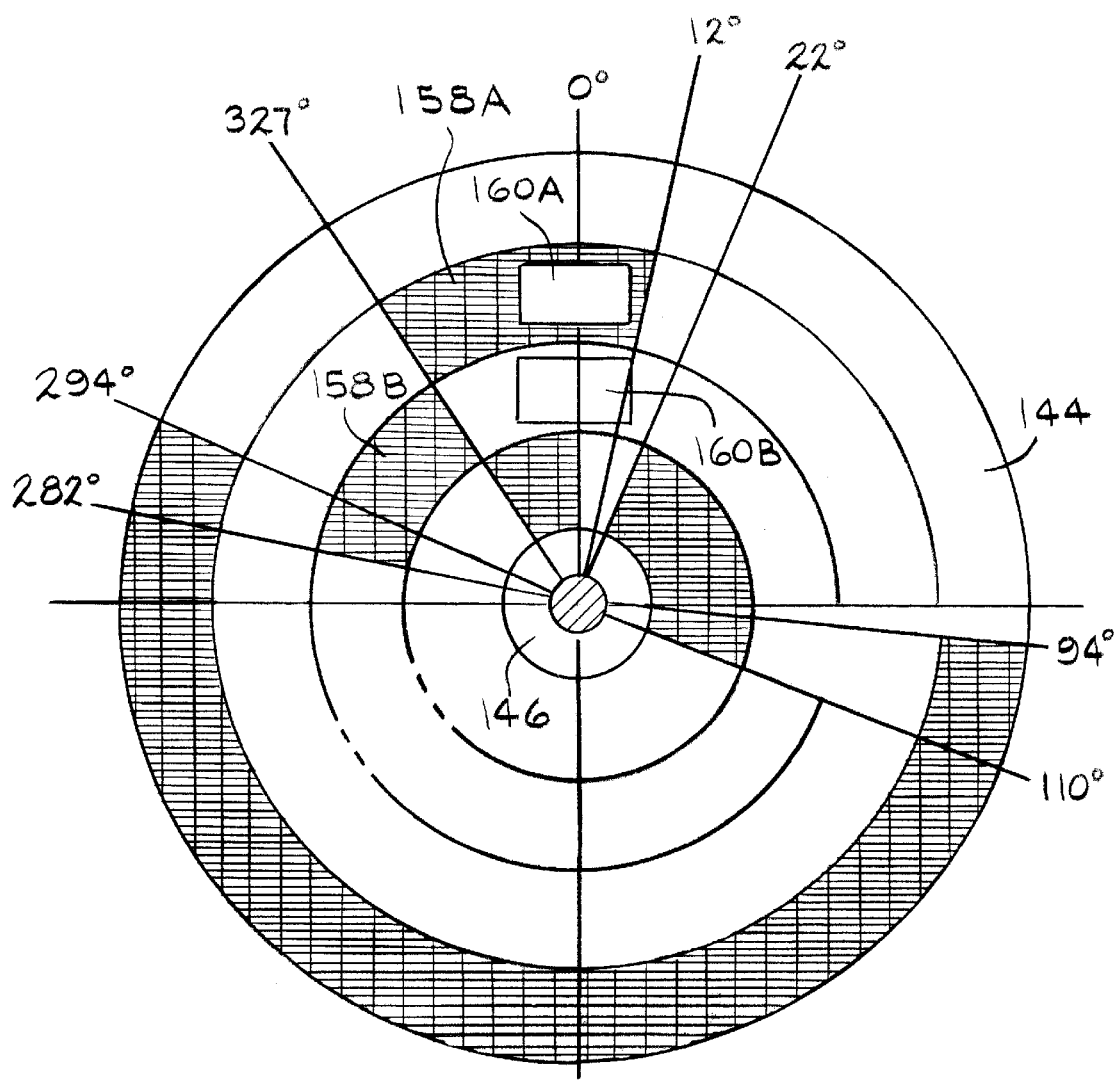
FIG. 5 is an enlarged, plan view of a shift rail position encoding assembly of an integrated shift control assembly according to the present invention.

Referring now to FIGS. 3 and 5, the circular plate 144 includes an array of curved magnetic regions 156 disposed in tracks 158A and 158B, in a configuration which is analogous to and generates Gray code data as the circular plate 144 rotates past a plurality, preferably two, non-contact sensors 160A and 160B. Each of the sensors 160A and 160B aligns with one of the tracks 158A and 158B of the region 156 in the circular plate 144. The sensors 160A and 160B are preferably Hall effect sensors although other types of sensors such as optical or variable reluctance sensors may be utilized. The magnetic regions 156 interact with the Hall effect sensors 160A and 160B. However, the circular plate 144 may be made of other materials or contain apertures which appropriately interact with the specific type of sensors 160A and 160B utilized.

As is apparent from FIG. 5, and the following Table I, incremental rotation of the circular plate 144 provides a plurality of unique combinations of signals from the sensors 160A and 160B which describes certain angular positions of the circular plate 144 to an associated microcontroller 162 mounted upon a circuit board 164 contained within the housing 112. In the following Table I, operational angular positions and their angular arcs are delineated and the output states of the two Hall effect sensors 160A and 160B are presented.

TABLE 1

| Position | Position Angle (°) | Sensor 160A | Sensor 160B |
|---|---|---|---|
| Left of High/Left Stop | 327 to 0 | 1 | 0 |
| High | 0 to 12 | 1 | 0 |
| Right of High | 12 to 22 | 0 | 0 |
| Zone 1 | 22 to 94 | 0 | 0 |
| Neutral | 94 to 110 | 0 | 0 |
| Zone 2 | 110 to 282 | 0 | 0 |

TABLE 1-continued

| Position | Position Angle (°) | Sensor 160A | Sensor 160B |
|---|---|---|---|
| Low | 282 to 294 | 0 | 1 |
| Right of Low/Right Stop | 294 to 327 | 0 | 1 |

The magnet ring 120 and the circular plate 144 cooperate to provide highly accurate position information to the microcontroller 162 which is disposed upon a printed circuit board 164 within the auxiliary housing 112. That is, the circular plate 144 provides a positive indication of the two end positions, a first end position between 0 and 12° indicating high gear and a second end position beginning at 282° and 294° of rotation indicating low gear. Between these two regions and end adjacent regions which are positively identified by the two Hall effect sensors 160A and 160B, the magnet ring 122 provides a pulse every ninety degrees of rotation (four pulses per revolution) to the microcontroller 162 which allows it to not only determine the current activity of the drive motor 114, i.e., operation and direction, but also to compute the position of the output shaft 146 and output member 150. This is possible, of course, because the gear train assembly provides a fixed, known and repeating position and speed reduction between the output shaft 16 of the drive motor 114 and the output shaft 146 and output member 150 of the shift assembly 110. In the preferred embodiment, the gear reduction ratio through the gear train is 246.81 to 1.00. Thus the pulses from the sensor 122 generated by rotation of the magnet ring 120 can be counted to determine the position of the circular plate 144 where the coded signals from the Hall effect sensors 160A and 160B do not provide position information, that is, in the region from more than 12° to fewer than 282°. For example, from a known starting position, the position of the output shaft 146 can be computed by dividing the number of pulses from the sensor 122 by 987.24 (246.81×4).

Depending upon the definition necessary, that is, how many unique detected and coded positions of the circular plate 144 are necessary as well as the logic and operating capabilities of the microcontroller 162 and its software, a circular plate 144 having three tracks and three sensors or four tracks and four sensors may also be utilized.

The circuit board 164, as noted, is fully contained within the auxiliary housing 112 of the integrated shift control assembly 110. As such, it is protected from ambient conditions by a relatively rugged housing which protects and locates the mechanical components of the assembly 110. The sensors 122, 160A and 160B are mounted directly to the circuit board 164 as are many other electronic and semiconductor devices (not illustrated). A gasket 166 seals the two halves of the auxiliary housing 112 and maintains conditions inside the housing 112 suitable for operation of the drive motor 114, the gear train and the components on the printed circuit board 164. Electrical conductors 168 connect the drive motor 114 to appropriate terminals on the printed circuit board 164. A connector housing 172 is sealingly secured to the auxiliary housing 112 and includes a plurality of electrical terminals 174 which provide electrical energy and various control signals (e.g., the driver controlled switches or push buttons 48) to the microcontroller 162 and the motor 114. It will be appreciated that the disposition of the microcontroller 162 and associated electronic devices within the housing 112 of the integrated shift control assembly 114 not only shortens many electrical leads such as those conductors 168 from the printed circuit board 164 to the electric motor 114 but also minimizes the number of electrical terminals 174 and associated wiring to the printed circuit board 164 which must pass through the housing 112.

The splined counterbore 154 of the output member 150 receives complementarily configured male or external splines 178 on a rotatable shift rail 180. An oil seal 184 provides a suitable fluid-tight seal between the shift rail 180 and the housing assembly 50.

Figure 6:
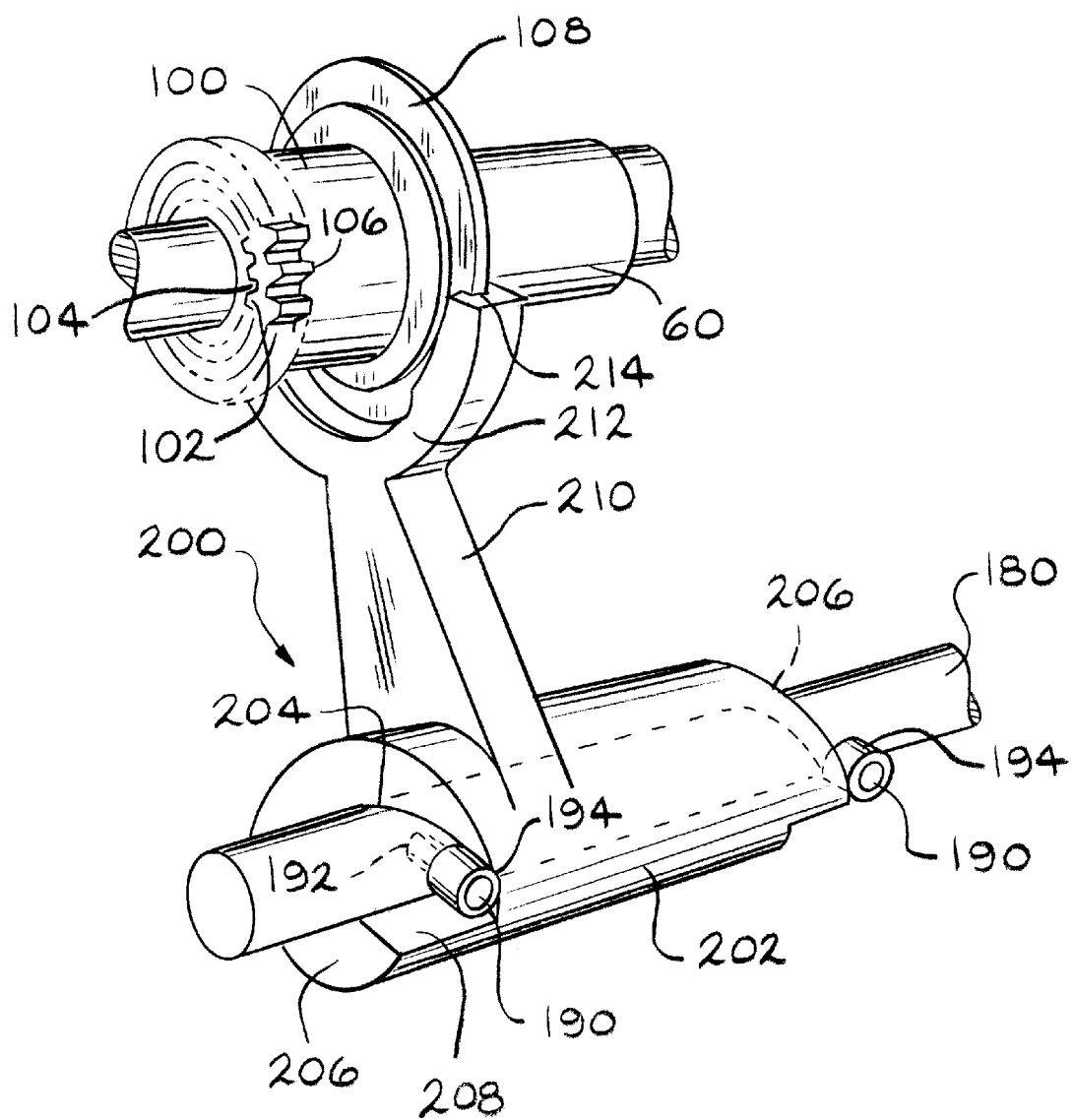
FIG. 6 is an enlarged, perspective view of a shift fork assembly according to the present invention.

Referring now to FIGS. 2 and 6, the rotatable shift rail 180 extends across the housing assembly 50 and its opposite end is seated within a suitable counterbore 186 formed in the housing assembly 50. A pair of spaced-apart radially disposed stanchions or stub shafts 190 are securely seated within radial passageways 192 in the shift rail 180. The stub shafts 190 include enlarged heads which retain freely rotatable cam followers or rollers 194 thereon. Disposed between the spaced-apart stanchions or stub shafts 190 and the rollers 194 is a shift fork assembly 200.

The shift fork assembly 200 includes a body 202 having a through passageway 204 which is sized to just freely rotatably receive the shift rail 180. At each end of the shift fork body 202 is a helical cam 206. Preferably, the angle of the helical cams 206 is chosen to balance the forces that result from the drag of the automatic transmission 14 in neutral. The helical cams 206 are correspondingly disposed such that the axial distance from corresponding points on their surfaces is just slightly less than the distance between the inside surfaces of the rollers 194. An axially extending face or shoulder 208 which represents a discontinuity in the helical cams 206 acts as a positive stop in one direction of rotation as it engages one of the rollers 194.

The shift fork assembly 200 also includes an obliquely extending web 210 which terminates in a shift yoke 212 having ears which define a discontinuous, semi-circular channel or groove 214. The semi-circular channel or groove 214 receives and engages the flange 108 of the clutch collar 100. Such engagement inhibits rotation of the shift fork assembly 200. Accordingly, as the shift rail 180 and the cam followers or rollers 194 rotate, the shift fork assembly 200 and specifically the yoke 212 and clutch collar 100 translate axially and bi-directionally. Such translation of the yoke 212 effects selective engagement of the clutch collar 100 and selection of high gear, neutral or low gear as previously explained.

Referring again to FIG. 2, the transfer case assembly 16 also includes an electromagnetically actuated disc pack type clutch assembly 220. The clutch assembly 220 is disposed about the output shaft 60 and includes a circular drive member 222 coupled to the output shaft 60 through, for example, a splined interconnection. The circular drive member 222 includes a plurality of circumferentially spaced-apart recesses 226 in the shape of an oblique section of a helical torus. Each of the recesses 226 receives one of a like plurality of load transferring balls 228.

A circular driven member 232 is disposed adjacent the circular drive member 222 and includes a like plurality of opposed recesses 234 defining the same shape as the recesses 226. The oblique side walls of the recesses 226 and 234 function as ramps or cams and cooperate with the balls 228 to drive the circular members 222 and 232 apart in response to relative rotation therebetween. It will be appreciated that the recesses 226 and 234 and the load transferring balls 228 may be replaced with other analogous mechanical elements which cause axial displacement of the circular members 222 and 232 in response to relative rotation therebetween. For example, tapered rollers disposed in complementarily configured conical helices may be utilized.

The circular driven member 232 extends radially outwardly and is secured to a soft iron rotor 236. An armature 242 is disposed adjacent the face of the rotor 236. The rotor 236 surrounds an electromagnetic coil 244 on three sides.

The electromagnetic coil 244 is provided with electrical energy preferably from a pulse width modulation (PWM) control through an electrical conductor 246. The pulse width modulation scheme increases or decreases the average current to the electromagnetic coil 244 of the electromagnetic clutch assembly 220 and thus torque throughput of the disc pack type clutch assembly 220, as will be more fully described below, by increasing or decreasing the on time (duty cycle) of a drive signal. It will be appreciated that other modulating control techniques may be utilized to achieve engagement and disengagement of the electromagnetic disc pack type clutch assembly 220.

Providing electrical energy to the electromagnetic coil 244 causes magnetic attraction of the armature 242 with the rotor 236. This magnetic attraction results in frictional contact of the armature 242 to the rotor 236. When the output shaft 60 is turning at a different speed than the armature 242 this frictional contact results in a frictional torque being transferred from the output shaft 60, through the circular drive member 222, through the load transferring balls 228 and to the circular driven member 232. The resulting frictional torque causes the balls 228 to ride up the ramps of the recesses 226 and 234, causing axial displacement of the circular drive member 222. Axial displacement of the circular drive member 222 translates an apply plate 248 axially toward a disc pack clutch assembly 250. A compression spring 252 which may comprise a stack of Belleville washers provides a restoring force which biases the circular drive member 222 toward the circular driven member 232 and returns the load transferring balls 228 to center positions in the circular recesses 226 and 234 to provide maximum clearance and minimum friction between the components of the electromagnetic clutch assembly 220 when it is deactivated. An important design consideration of the recesses 226 and 234 and the balls 28 is that the geometry of their design and the design of the compression spring 252 and the clearances in the disc pack assembly 250 ensure that the electromagnetic clutch assembly 220 is not self-locking. The electromagnetic clutch assembly 220 must not self-engage but rather must be capable of controlled, proportional engagement and torque transfer in direct response to the modulating control input.

The disc pack clutch assembly 250 includes a first plurality of smaller friction plates or discs 254. The first plurality of discs 254 are coupled by interengaging splines to a clutch hub 256 which is coupled to the output shaft 60 for rotation therewith. A second plurality of larger friction plates or discs 258 are coupled to an annular housing 260 by interengaging splines for rotation therewith and are interleaved with the first plurality of friction discs 254.

The annular housing 260 is disposed concentrically about the output shaft 60 and is coupled to a chain drive sprocket 262 by a plurality of interengaging splines or lugs and recesses 264. The chain drive sprocket 262 is freely rotatably disposed on the output shaft 60 and is supported by a journal or needle bearing assembly 266. When the clutch assembly 220 is engaged, it transfers energy from the output shaft 60 to the chain drive sprocket 262. A drive chain 268 is received upon the chain drive sprocket 262 and engages and transfers rotational energy to a driven chain sprocket 270. The driven chain sprocket 270 is coupled to a front (secondary) output shaft 272 of the transfer case assembly 16 by interengaging splines 274.

The transfer case assembly 16 also includes a first Hall effect sensor 280 having an output line 282 which is disposed in proximate, sensing relationship with a plurality of teeth on a first tone wheel 286 which is coupled to and rotates with the rear (primary) output shaft 60. A second Hall effect sensor 290 has an output line 292 and is disposed in proximate, sensing relationship with a plurality of teeth on a second tone wheel 296 disposed adjacent the driven sprocket 270 on the front output shaft 272. Preferably, the number of teeth on the first tone wheel 286 is identical to the number of teeth on the second tone wheel 296 so that identical shaft speeds result in the same number of pulses per unit time from the Hall effect sensors 280 and 290. This simplifies computations relating to shaft speeds and improves the accuracy of all logic decisions based on such data and computations. As to the actual number of teeth on the first tone wheel 286 and teeth on the second tone wheel 296, it may vary from thirty to forty teeth or more or fewer depending upon rotational speeds and sensor construction.

The first and second Hall effect sensors 280 and 290 sense the respective adjacent teeth and provide a series of pulses in the lines 282 and 292, respectively, which may be utilized to compute the instantaneous rotational speeds of the rear output shaft 60 and the front output shaft 272 which, of course, correspond to the rotational speeds and the rear drive shaft 22 and the front drive shaft 32, respectively.

The transfer case assembly 16 incorporating an integrated electric shift control assembly 110 according to the present invention provides improved operational control and positioning of a clutch collar such as the clutch collar 100 and indication of the position of such clutch collar 100. Such improved operation is the result of several features of this assembly. First of all, securing the circular plate 144 so that it rotates with, and is therefore always representative of the position of the shift rail 180 and thus of the shift fork assembly 200, ensures that any microcontroller 164 or microprocessor receives accurate information regarding the position of these components. The non-contact Hall effect sensors 122, 160A and 160B provide both high definition of the position of the shift fork assembly 200 as well as improved reliability.

Since torque block or spline block may be encountered when engagement of the clutch collar 100 is attempted and since the electric drive motor 114 effectively directly drives the clutch collar 100, i.e., there is no resilient coupling or energy storing device in the shift control assembly 110, shifts that cannot be fully completed due to torque or spline block will be detected by the sensors 160A and 160B and such shift commands may be temporarily withdrawn and then repeated by the software of the microcontroller 162 or microprocessor.

The foregoing disclosure is the best mode devised by the inventors for practicing this invention. It is apparent, however, that apparatus incorporating modifications and variations will be obvious to one skilled in the art of shift control mechanisms. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. An integrated shift control assembly for a power transmission device comprising, in combination,
   a housing,
   a drive motor disposed in said housing and having an output,
   a sensor drive ring disposed for rotation on said output of said electric drive motor,
   a first sensor disposed in sensing relationship with said sensor drive ring,
   a gear train disposed in said housing, operably coupled to said output of said drive motor and having an output member,
   a member disposed for rotation with said output member, said member defining a plurality of distinct signal generating regions,
   a plurality of sensors disposed in sensing relationship with said member, and
   a circuit board disposed in said housing and having a microcontroller operably coupled to said sensors and said drive motor.

2. The shift control assembly of claim 1 wherein said sensors are Hall effect sensors.

3. The shift control assembly of claim 1 further including a driver controlled switch having an output connected to said microcontroller.

4. The shift control assembly of claim 1 further including a shift rail coupled to said output member and a shift fork disposed for axial translation on said shift rail.

5. The shift control assembly of claim 1 wherein said first sensor senses both direction of rotation and speed of rotation.

6. The shift control assembly of claim 1 wherein said gear train includes a plurality of pinion gears and spur gears which reduce speed and increase torque of said drive motor.

7. The shift control assembly of claim 1 wherein further including a multiple conductor connector extending through said housing.

8. An integrated shift control assembly for a power transmission device comprising, in combination,
   a housing,
   an electric drive motor disposed in said housing and having an output,
   a rotation sensing assembly on said output of said electric drive motor,
   a gear train disposed in said housing, operably coupled to said output of said drive motor and having an output member,
   a plate disposed for rotation with said output member, said plate defining a plurality of angularly distinct regions,
   a plurality of sensors disposed in sensing relationship with said plate, and
   a circuit board disposed in said housing and having a microcontroller operably coupled to said sensor assembly and said sensors.

9. The shift control assembly of claim 8 wherein said sensor assembly and sensors include Hall effect sensors.

10. The shift control assembly of claim 8 wherein said gear train includes a plurality of pinion gears and spur gears which reduce speed and increase torque of said drive motor.

11. The shift control assembly of claim 8 wherein said microcontroller operably controls said electric drive motor.

12. The shift control assembly of claim 8 further including a driver controlled switch having an output connected to said microcontroller.

13. The shift control assembly of claim 8 further including a two-speed transfer case having a clutch for selecting one of said speeds and a shift fork operably driven by said output member for positioning said clutch.

14. The shift control assembly of claim 8 wherein said electric drive motor is controlled by said microcontroller.

15. A shift control assembly for a power transmission device having at least two operating modes comprising, in combination, an input member, a speed reducing assembly having an output, a clutch member for selectively engaging at least said input member and said output of said speed reducing assembly output, a rotating shift rail having a pair of spaced apart cam followers, a shift fork engaging said clutch member, said shift fork disposed on said shift rail and including a pair of cams, each of said cams engaged by a respective one of said pair of cam followers, a member disposed for rotation with said shift rail, said flat member defining an array angularly distinct regions, a plurality of sensors disposed in sensing relationship with said array of angularly distinct regions, a drive motor having a bi-directional output and a sensing member disposed thereon a sensor associated with said sensing member for sensing rotation of said drive motor, a gear train driven by said output of said drive motor and driving said shift rail, and a microcontroller for receiving signals from said sensor and operably driving said drive motor.

16. The shift control assembly of claim 15 wherein said plurality of sensors include at least three Hall effect sensors.

17. The shift control assembly of claim 15 wherein said sensor associated with said sensing member also senses direction of rotation.

18. The shift control assembly of claim 15 wherein said gear train includes a plurality of pinion gears and spur gears which reduce speed and increase torque of said drive motor.

19. The shift control assembly of claim 15 wherein said pair of cams are spaced apart a first distance equal to a second distance separating said cam followers.

20. The shift control assembly of claim 15 further including a driver controlled switch having an output connected to said microcontroller.

* * * * *